2,790,743

SUBSTITUTED 1,4-HYDROQUINONE FUNGICIDAL COMPOSITIONS AND METHOD OF USING SAME

Nicolaas Dost and Gerarda Francisca Elisa Maria Klap-Dierick, Amsterdam, Netherlands, assignors to Shell Development Company, New York, N. Y., a corporation of Delaware No Drawing. Application June 27, 1955,
Serial No. 518,326

Claims priority, application Netherlands July 30, 1954

7 Claims. (Cl. 167—31)

The present invention relates to a method for controlling fungi and to novel fungicidal compositions effective therefor.

Although numerous materials have been proposed as fungicides for agricultural purposes, very few chemical fungicides effective against vascular diseases are known. The new fungicides of this invention are of particular importance owing to the fact that they have been found to be extremely effective against vascular diseases of plants, such as Fusarium and Verticillium.

The new fungicidal compositions of the invention comprise as their essential active ingredient one or more substituted hydroquinones having the general formula $$(OH)_2Ar(SR)_n$$

in which Ar represents an aromatic hydrocarbon nucleus, each R represents a hydrocarbon radical, such as an alkyl, aryl, alkaryl, aralkyl, or cycloalkyl group, and $n$ represents an integer of from 2 to 4, inclusive.

Mercapto-substituted hydroquinones which correspond to the above formula and give very good results in controlling fungi include such compounds in which the radical represented by Ar is a naphthalene nucleus, for example, 2,3 - di(thiodecyl) - 1,4 - naphthohydroquinone, 2,3-di(methylthio) - 1,4 - naphthohydroquinone and 2,3-di(p-methylbenzthio)-1,4-naphthohydroquinone. In the preferred compositions of the invention, the active ingredient preferably is one that corresponds to the above general formula in which Ar represents a benzene ring, R being a saturated or an aromatic hydrocarbon radical having from 1 to 10 carbon atoms. Examples of such preferred compounds with which excellent results are obtained in controlling fungi are: 2,3-di(methylthio)-1,4-hydroquinone; 2,3-di(octylthio)-1,4 - hydroquinone; 2,3-di(benzylthio)-1,4-hydroquinone; as well as 2,3,5,6-tetra(ethylthio)-1,4 - hydroquinone; 2,3,5,6 - tetra(n-decylthio)-1,4-hydroquinone; 2,3,5,6-tetra(p-methylbenzthio)-1,4-hydroquinone; and 2,3,5,6-tetra(benzylthio)-1,4-hydroquinone.

The fungicidal compositions of the invention may contain the above-described compounds as such. The compounds may also be used with good results in the form of their alkali salts, such as the sodium, potassium, lithium, and other water-soluble salts. The above-described active agents of the novel compositions of the invention may be prepared, for example, by reducing the corresponding quinones by known procedures, such as by treatment with glacial acetic acid and zinc dust or other source of nascent hydrogen or by treatment with other reducing agents, such as alkali metal hydrosulfides. The mercapto-substituted quinones can be prepared in turn by known procedures, such as by the reaction of mercapto-substituted aliphatic or aromatic hydrocarbons with substituted or unsubstituted quinones, e. g., benzoquinone or naphthoquinone.

The fungicidal compositions of the invention comprise one or more S-substituted polythiohydroquinones corresponding to the foregoing formula, with additional active ingredients, if desired, and a solid or liquid carrier or diluent, or both solid and liquid carriers or diluents, as fungicide adjuvant therefor. Examples of suitable adjuvants include water, hydrocarbon oils, such as kerosene and higher boiling petroleum distillates, and inert, sorbent, pulverulent solids, such as kaolin, bentonite, and other known agricultural diluents. Increased resistance to weathering, especially rain, can be imparted by adding highly viscous substances, such as residual hydrocarbon oils, proteinaceous materials or the like, to the compositions. Suitable examples of such so-called stickers are starch-like gelatinous and resinous substances and viscous liquids, such as heavy mineral oils.

For storage and transportation, compositions containing high concentrations of active agent, e. g., 10–50% by weight of active ingredient, are preferably prepared with a solid liquid carrier as diluent and, if desired, a surface-active agent. For application in the field, these concentrated compositions may be diluted with or emulsified in water shortly before application to attain the composition at desired field strength. Non-ionic emulsifiers preferably are employed to guard against the possible adverse effects of hard water. An emulsifiable concentrate which is especially satisfactory consists of a paste prepared by mixing one or more of the S-substituted thiohydroquinones with a surface-active material, such as one consisting essentially of polyethoxylated alkyl phenols. Such a surface-active material may be that obtainable commercially under the trade name "Triton X-155" (Rohm and Haas) or equivalent non-ionic surfactant. From the concentrate, which may contain even more than the above-mentioned 50% of fungicidal component, there can be prepared a solution or dispersion suitable for application in the field simply by mixing with the appropriate amount of water. Similar concentrates may also be prepared by mixing one or more of the fungicidal components in powder form with one or more solid surface-active agents, also in powder form. Wettable powders suitable for dispersion in water and application by spray techniques may be prepared by admixing the fungicidal component, a surface-active agent and a suitable pulverulent carrier, such as bentonite.

The concentration of the fungicidal component in the final spray composition is subject to variation, for instance, according to the activity of the fungicidal component and, when used on plants, the degree and kind of infestation. The concentration of active material thus may be varied from about 0.01% to about 10% by weight. For agricultural purposes, good results are obtained with concentrations between about 0.03% and about 1% by weight of the total composition, preferably between about 0.05 and about 0.5% by weight.

Aqueous solutions or dispersions of one or more of the S-substituted polythiohydroquinones have been found to be most effective for controlling Fusarium. In most cases, these hydroquinones are not sufficiently water soluble to yield a simple aqueous solution of the concentration required for good disease control. Although in such cases the alkali salts of the hydroquinones may be used, these being readily soluble in water, the best results are obtained with aqueous heterogeneous dispersions of the hydroquinones per se containing a small amount, e. g., from about 0.01 to about 2% by weight calculated on the total quantity of liquid, of a surface-active substance.

The invention is not regarded as being limited in any way according to theory. Applicants are of the opinion, however, that the effectiveness of these dispersions may be explained substantially as follows: As indicated immediately above, the S-substituted polythiohydroquinones are usually insufficiently water soluble to attain the concentration required for good fungicidal control. When, however, the desired amount of toxicant is introduced in water in such a way that the undissolved part is kept in a finely dispersed state or suspension by means of a surface-active substance, the quantity of toxicant absorbed from solution by the plant is almost immediately supplemented from or replaced by additional toxicant entering the solution from the dispersed phase. Using aqueous media, when the toxicant was not applied in such a dispersed form it was found that the amount of toxicant withdrawn by the plant from solution could not be replaced quickly enough from the undissolved part, with the result that the most effective fungus control could be obtained only with the aid of fine dispersions.

Examples of surface-active materials which may be employed in making up such aqueous dispersions include known ionic or nonionic dispersing agents, such as long-chain alkyl sulfates, alkaryl sulfates, sulfosuccinates, and alkyl and/or aryl ethers of polyethylene glycols, such as the alkylated phenol ethers of polyethylene glycol, available commercially under the trade name "Triton."

For controlling fungi, the compositions of the invention generally are applied to the surface to be treated by spraying. They also may be applied by dipping, brushing or like means. For controlling Fusarium and other vascular diseases in plants, the toxicant should come into contact with the roots. For example, the plants to be treated may be allowed to stand for a suitable time in an aqueous solution or dispersion of the fungicidal agent, or such a solution or dispersion may be introduced into the ground in the vicinity of the roots of the plant.

The invention can be further illustrated by means of the following non-limitative examples.

EXAMPLE I

The table below shows test results with a number of compounds used according to the invention in controlling Fusarium infestation of cucumbers. The test compositions were employed in the form of aqueous dispersions containing 0.03 to 1.0% by weight of active material and 0.1% by weight of "Triton X–155," both calculated on the total amount of water, except in that the two cases in which the potassium salts were used, the surface-active agent was omitted. The test plants, after infection with Fusarium, were allowed to stand for some time in one of the aqueous solutions or dispersions and thereafter were planted. The observed results are expressed in terms of the growth ratio, which is equal to the quotient of the average length of the treated infected plants, measured after a suitable growing period, divided by the average length of untreated infected plants used as controls.

Table

| Test Compound | Concentration (percent by weight) | Growth Ratio |
|---|---|---|
| 2,5-bis(benzylthio)-1,4-hydroquinone (C$_6$H$_5$–CH$_2$–S– and –S–CH$_2$–C$_6$H$_5$ substituents) | 0.05 | 1.58 |
| 2,5-bis(tolylthio)-1,4-hydroquinone (CH$_3$C$_6$H$_4$–S– substituents) | 0.05 | 1.67 |
| 2,5-bis(decylthio)-1,4-hydroquinone (C$_{10}$H$_{21}$–S– substituents) | 0.05 | 1.85 |
| 2,5-bis(isobutylthio)-1,4-hydroquinone (C$_3$H$_7$(CH$_3$)CH–S– substituents) | 0.05 | 1.22 |
| 2,3,5,6-tetra(ethylthio)-1,4-hydroquinone (C$_2$H$_5$–S– substituents) | 0.05 | 1.39 |
|  | 0.1 | 1.69 |
|  | 0.3 | 1.96 |
|  | 0.5 | 2.51 |
|  | 1.0 | 4.65 |
| Dipotassium salt, 2,5-bis(ethylthio)-1,4-hydroquinone (OK groups) | 0.03 | 1.55 |
| Dipotassium salt, 2,3,5,6-tetra(ethylthio)-1,4-hydroquinone (OK groups) | 0.05 | 1.28 |
|  | 0.03 | 1.20 |

It will be seen in all cases that there was obtained a pronounced increase in growth resulting from mitigation of the fungus infection, amounting to as much as 465% compared to the untreated control plants.

EXAMPLE II

Cucumber plants were implanted in soil heavily infected with Fusarium. To the rhizosphere of some of the plants, there was added an aqueous dispersion of 0.1% by weight of 2,3,5,6-tetra(methylthio)-1,4-hydroquinone containing 0.1% by weight of "Triton X–155" as dispersing agent. Other of the plants were left untreated. After a suitable growing period, the length of the plants was measured. The growth ratios were found to be from 8 to 12. In other words, owing to the good control of the infestation, the growth of the treated plants was from 8 to 12 times as much as that of the untreated plants.

Although the invention is of particular interest for controlling fungus infections in agriculture, the invention may also be applied to preserving or protecting other things than plants which are subject to fungus attack. For example, leather and textiles may be treated with finishing agents to which one or more of the S-substituted polythiohydroquinones described herein have been added. Wood, paper, paints and similar materials may also be protected against fungi with the aid of the active agents of the invention. The S-substituted polythiohydroquinones may be employed as the sole biocidal agent or, if desired, additional biocidal agents may be incorporated in the compositions of the invention, such as known insecticides, larvacides and the like.

We claim as our invention:

1. A method for controlling fungi which comprises subjecting the fungi to the action of a compound selected from the class consisting of the 1,4-hydroquinones of the formula $$(OH)_2Ar(SR)_n$$

in which Ar represents an aromatic nucleus selected from a hydrocarbon of the group consisting of benzene and naphthalene, each R represents a hydrocarbon radical having up to 10 carbon atoms, and $n$ represents an integer of from 2 to 4, inclusive, and alkali salts thereof.

2. A method for controlling fungi which comprises subjecting the fungi to the action of 2,3,5,6-tetra(ethylthio)-1,4-hydroquinone.

3. A method for controlling fungi which comprises subjecting the fungi to the action of 2,3-di(benzylthio)-1,4-naphthohydroquinone.

4. A method for controlling fungi which comprises subjecting the fungi to the action of 2,3,5,6-tetra(n-decylthio)-1,4-hydroquinone.

5. A method for controlling Fusarium infection of living plants which comprises introducing into the rhizosphere of the plant a compound selected from the class consisting of the 1,4-hydroquinones of the formula $$(OH)_2Ar(SR)_n$$

in which Ar represents an aromatic nucleus selected from a hydrocarbon of the group consisting of benzene and naphthalene, each R represents a hydrocarbon radical having up to 10 carbon atoms, and $n$ represents an integer of from 2 to 4, inclusive, and alkali salts thereof.

6. A fungicidal composition comprising a dispersion of a 1,4-hydroquinone having the formula $$(OH)_2Ar(SR)_n$$

in which Ar represents an aromatic nucleus selected from a hydrocarbon of the group consisting of benzene and naphthalene, each R represents a hydrocarbon radical having up to 10 carbon atoms, and $n$ represents an integer of from 2 to 4, inclusive, in water containing a surface-active agent.

7. A fungicidal composition comprising a compound selected from the class consisting of the 1,4-hydroquinones of the formula $$(OH)_2Ar(SR)_n$$

in which Ar represents an aromatic nucleus selected from a hydrocarbon of the group consisting of benzene and naphthalene, each R represents a hydrocarbon radical having up to 10 carbon atoms, and $n$ represents an integer of from 2 to 4, inclusive, and a diluent as fungicidal adjuvant therefor.

No references cited.